United States Patent
Colombo et al.

(10) Patent No.: US 8,363,509 B2
(45) Date of Patent: *Jan. 29, 2013

(54) METHOD FOR BUILDING VELOCITY MODELS FOR PRE-STACK DEPTH MIGRATION VIA THE SIMULTANEOUS JOINT INVERSION OF SEISMIC, GRAVITY AND MAGNETOTELLURIC DATA

(76) Inventors: Daniele Colombo, Meda (IT); Michele De Stefano, Jerago Con Orago (IT)

( * ) Notice: Subject to any disclaimer, the term of this patent is extended or adjusted under 35 U.S.C. 154(b) by 480 days.

This patent is subject to a terminal disclaimer.

(21) Appl. No.: 12/438,534

(22) PCT Filed: Sep. 4, 2006

(86) PCT No.: PCT/IT2006/000636
§ 371 (c)(1),
(2), (4) Date: Feb. 23, 2009

(87) PCT Pub. No.: WO2008/029420
PCT Pub. Date: Mar. 13, 2008

(65) Prior Publication Data
US 2010/0014384 A1    Jan. 21, 2010

(51) Int. Cl.
*G01V 1/30* (2006.01)
(52) U.S. Cl. ............................. 367/38; 367/73
(58) Field of Classification Search ............ 367/38, 367/73
See application file for complete search history.

(56) References Cited

U.S. PATENT DOCUMENTS

| | | | |
|---|---|---|---|
| 5,671,136 A | 9/1997 | Willhoit, Jr. | |
| 6,546,339 B2 * | 4/2003 | Bevc et al. | 702/18 |
| 6,603,313 B1 * | 8/2003 | Srnka | 324/354 |
| 7,065,004 B2 * | 6/2006 | Jiao et al. | 367/51 |
| 7,805,250 B2 * | 9/2010 | Colombo et al. | 702/14 |
| 2003/0021184 A1 | 1/2003 | Zhang | |
| 2004/0162677 A1 * | 8/2004 | Bednar et al. | 702/14 |
| 2008/0059075 A1 | 3/2008 | Colombo | |

OTHER PUBLICATIONS

European Patent Office, EP 08161220.2 Examination Report dated Jul. 31, 2009 (3 pages).
European Patent Office ISA, PCT/IT2006/000636 Search Report dated Nov. 27, 2007 (12 pages).
Colombo et al., Geophysical modeling via simultaneous joint inversion of seismic, gravity, and electromagentic data: Application to prestack depth imaging, XP-001504879—Mar. 2007 (6 pages).
Heincke et al., Joint Inversion of MT, Gravity and Seismic Data applied to sub-basalt Imaging, SEG/New Orleans 2006 Annual Meeting, XP-002505016, pp. 784-789.

(Continued)

*Primary Examiner* — Eric Bolda

(57) ABSTRACT

A method for quantitatively evaluating and using multiple geophysical datasets and external constraints for performing velocity model building through simultaneous Joint Inversion and finalized at the improvement of seismic depth images in particularly difficult geology and hydrocarbon high-risk exploration areas is disclosed, which involved the development of techniques:
- to derive an iterative depth-domain seismic imaging workflow which allows for the simultaneous use of seismic post-migration Common Image Gather residuals together with first arrival (First Break) residuals in conjunction with gravity data and magnetotelluric data;
- to include in the iterative Joint Inversion workflow the setup of external a-priori constraints as well as of external constraints weighted by probability functions;
- to include in the iterative Joint Inversion workflow the probabilistic evaluation of the relationships among geophysical parameters that are distinguished into analytical, empirical and structural (i.e. pattern semblance) parameters;
- to allow the user for defining variable amounts of probabilistic weights to the parameters participating to the Joint Inversion.

23 Claims, 7 Drawing Sheets

OTHER PUBLICATIONS

Aversana, Integration of seismic, MT and gravity data in a thrust belt interpretation, First Break, vol. 19, Jun. 2001, XP-002457952, pp. 335-341.

Gallardo et al., Joint two-dimensional DC resistivity and seismic travel time inversion with cross-gradients constraints, Journal of Geophysical Research American Geophys. Union, USA, vol. 109, No. B3, Mar. 10, 2004 (11 pages).

Hovertsten et al., Direct reservoir parameter estimation using joint inversion of marine seismic AVA and CSEM data, Geophysics Society Exploration Geophysicists USA, vol. 71, No. 3, May 2006, pp. C1-C13.

Kowalsky et al., Joint inversion of geophysical and hydrological data for improved subsurface characterization, Leading Edge Soc. Exploration Geophysicists USA, vol. 25, No. 6, Jun. 2006, pp. 730-734.

U.S. Patent Office, U.S. Appl. No. 11/829,551, Non-Final Rejection dated Apr. 29, 2010, pp. 1-6 and attachments.

Extended Search and Examination Report of EP Application No. 08161220.2-2213 dated Dec. 3, 2008.

Examination Report of EP Application No. 06809975.3-1240 dated Aug. 9, 2011.

Paolo Dell'Aversana, "Integration loop of 'global offset' seismic, continuous profiling magnetotelluric and gravity data," first break, Nov. 2003, vol. 21: pp. 32-41.

* cited by examiner

METHOD FOR BUILDING VELOCITY MODELS FOR PRE-STACK DEPTH MIGRATION VIA THE SIMULTANEOUS JOINT INVERSION OF SEISMIC, GRAVITY AND MAGNETOTELLURIC DATA

The present invention refers to a method for building velocity models for Pre-Stack Depth Migration (PSDM) via the simultaneous Joint Inversion (JI) of seismic, gravity and magnetotelluric data.

Effective depth imaging through migration can be achieved only if a reliable estimate of the seismic velocity model is available (i.e. an area or volumetric description of the speed of the seismic waves like the compressional body wave velocity, commonly known as the P-wave velocity).

It is known that an incorrect seismic velocity model can cause severe lateral and vertical mispositioning of reflectors in depth other than avoiding the reconstruction of existing reflecting horizons.

This problem severely impacts the exploration of hydrocarbons by augmenting the risk of drilling dry wells or by misidentifying oil and gas bearing structures.

The derivation of a reliable P-velocity model for Pre-Stack Depth Migration (ill the following: PSDM) is not a trivial task especially in conditions of poor Signal-to-Noise ratio of the seismic data, little a-priori information about the subsurface seismic velocities and in case of complex laterally-varying geology.

Problematic seismic imaging conditions are typically encountered in thrust-belt hydrocarbon prospects but also for sub-basalt and sub-salt prospects (both land and marine).

In such cases, the integration of multiple geophysical parameters can successfully reconstruct the seismic velocity distribution in depth with higher degrees of reliability than using the seismic method alone, thus reducing the exploration risks.

BACKGROUND OF THE INVENTION

The derivation of a reliable velocity model can be performed through different approaches including model-driven and data-driven methods.

The so-called model-driven methods transform a geological section directly into a velocity model to be used for Pre-Stack Depth Migration (PSDM).

The convergence of the initial velocity estimate to the final velocity model is obtained in a trial-and-error approach consisting of manually changing the distribution of velocity in the model, performing a new PSDM and controlling the post-migration image gathers together with the geologic reliability.

These methods not always are able to provide seismic velocity models that agree with the measured geophysical data (i.e. arrival times of seismic waves, observed gravity anomalies or calculated resitivity functions from electromagnetic measurements) and explore only a limited sub-group of models (some of those which are geologically meaningful for the interpreter).

The so-called data-driven methods, following a more rigorous approach (minimization of a cost function), yield always the fit of the measured data but the final velocity structure might not agree with geological considerations.

Systematic and random errors in the input inversion data, non-uniqueness of the solution and sensitivity of the data to the model parameters (e.g. first-break tomography is more sensitive to high-velocity zones than to low-velocity ones, electromagnetic methods are more sensitive to conductive zones than to resistive ones), provide in many cases a difficult solution of the problem.

The integration of different source of information (geophysical data including seismic and non-seismic, a-priori information and interpretational constraints) reduces the non uniqueness of the solution and provides improved seismic resolution in complex geology conditions.

Data integration approaches were performed by several authors in the past by deriving a model in one of the domains (generally seismic), by transforming the data via empirical functions in another geophysical domain (e.g. density or resistivity) and by performing modeling or inversions in the corresponding non-seismic domain.

In some cases, the so-obtained models could be transformed back into the seismic velocity domain to be used to improve the seismic imaging results.

This approach, whilst valuable in principle, shows several problems in the actual implementation.

One of the most obvious problems consists of the definition of reliable functions relating seismic velocity to density or resistivity to allow the transformation of parameters in different geophysical domains.

The other problem is whilst, from one point of view, the target is the integration of data, the actual implementation of the described workflow provides a larger weight to the seismic-derived model rather than to the other non-seismic methods.

The non-seismic methods, in this approach, are confined to work around an initial model provided by seismic with little chances of substantially modifying it (especially in a linearized inversion approach).

SUMMARY

This inexact formulation of the integration problem is the main reason why the integration of different-nature geophysical data has been so far a matter of "art" related to the ability and experience of the geophysicists or interpreter rather than related to analytical and quantitative approaches.

The present invention provides a scheme for the quantitative implementation of the data integration problem for seismic imaging velocity model building where the relationships among different-nature geophysical data and a-priori information are quantified in analytical, empirical and probabilistic form and simultaneously jointly inverted for a multi physical-parameter model.

Scope of the present invention is to provide a method where seismic travel-time residuals, gravity data, magnetotelluric data (MT), external constraints and geological interpretation are quantitatively integrated in a simultaneous Joint Inversion (JI).

With the proposed method, the seismic compressional body wave velocity (i.e. P-velocity) portion of the multiparametric geophysical model is able to obtain benefits from the other geophysical methods without lost of resolution.

The improved P-velocity depth-domain reconstructed velocity field is then used for obtaining a more reliable Pre-Stack Depth Migrated (PSDM) image of the subsurface with a reduced number of iterations and with greater reliability if compared to other velocity model building conventional approaches.

The consequences of this consist of improving the resolution of the seismic images of the subsurface, improving the geological interpretation of structures and ultimately reducing the exploration risks.

Within the framework of a depth imaging project (i.e. pre-stack depth migration) the simultaneous joint inversion can take place at various levels during the velocity model building using both pre-migration seismic wave travel-time residuals (e.g. seismic first-arrival travel times in the form of first-breaks) and also post-migration residual-curvature depth-domain residuals (obtained from the analysis of post-migrated image gathers or Common Image Gathers—CIG).

As per the non-seismic portion of the joint-inversion input data, the above method allows for the use of gravity Bouguer anomaly data and magnetotelluric soundings (in the form of apparent resistivity and phase versus frequency or period).

The external constraints that can be applied for the inverse problem consist of the knowledge of geophysical parameter distributions within the model (e.g. from well logs) and the interpretative knowledge about the patterns and shapes of geologic bodies (i.e. geologic interpretation).

The dimensionality of the problem can be two-dimensional or three-dimensional and the methods for solving the inversion problem could be linear or non linear.

DESCRIPTION OF THE DRAWINGS

Further characteristics of the invention will be apparent from the detailed description that follows, referring to a purely exemplary and therefore non limiting embodiment thereof, illustrated in the appended drawings, in which.

PREFERRED EMBODIMENT

Figure 1:
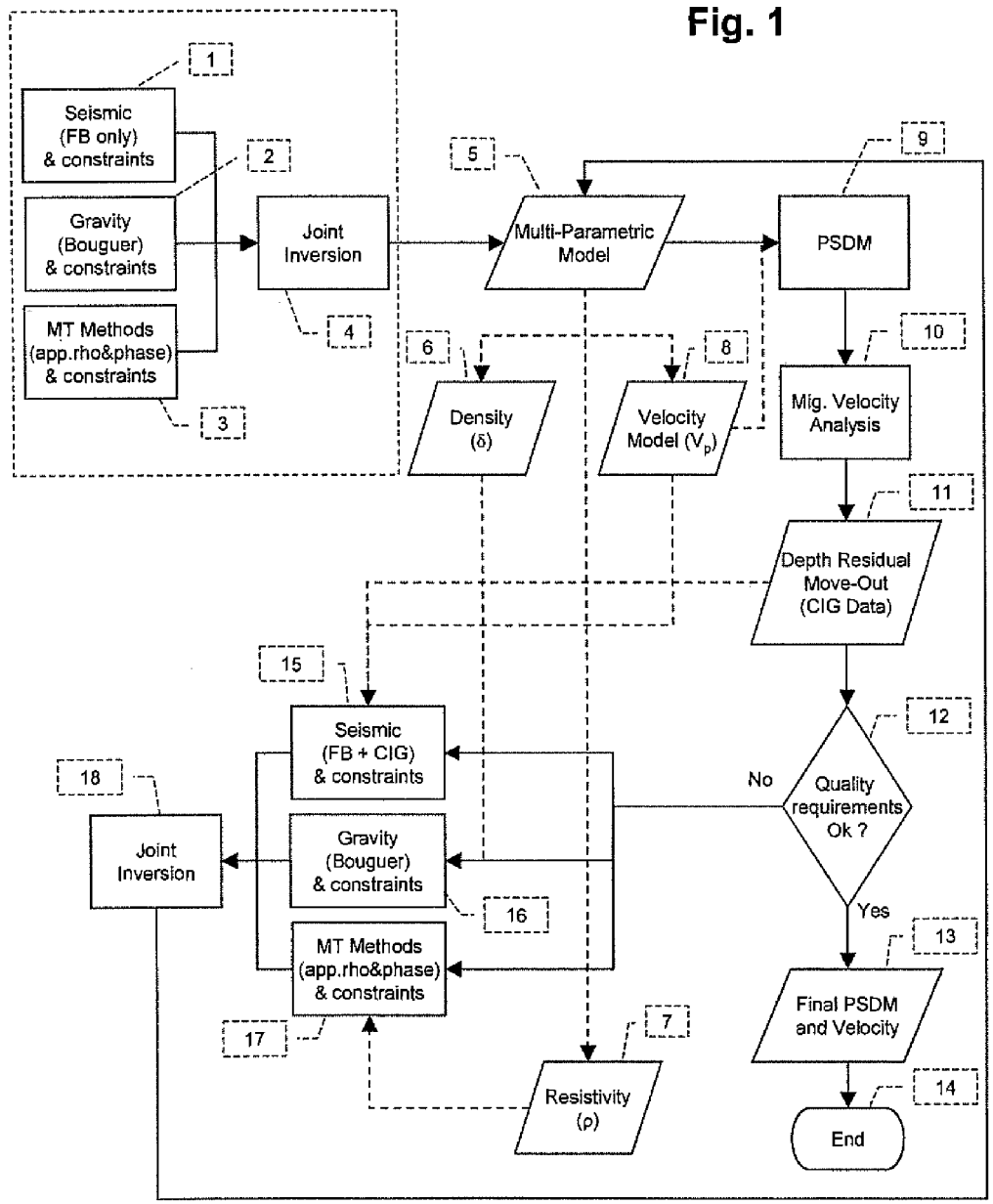
FIG. 1 is a block diagram describing the method to which the present invention refers.

A general block diagram describing a preferred embodiment of the method according to the invention is shown in FIG. 1.

Said method is aimed at using several input data for performing a reliable velocity model building for pre-stack depth migration.

The workflow starts from the seismic pre-migrated domain (pre-migration process) where the input data are the first arrival times 1 (known as First Breaks—FB) for the seismic portion, gravity data 2 in the form of the Bouguer anomaly and magnetotelluric (MT) data 3 for the electromagnetic (EM) portion.

Figure 2:
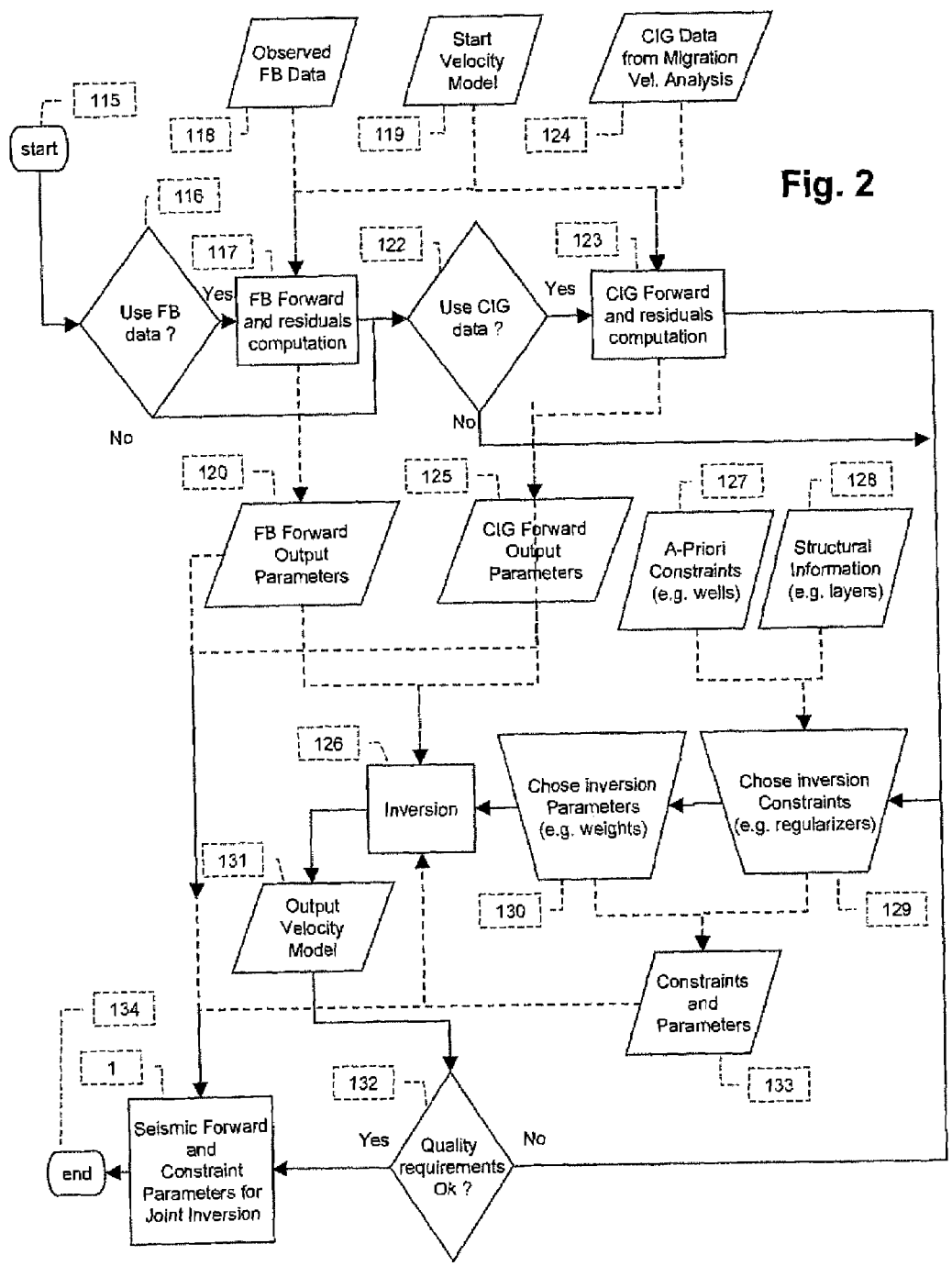
FIG. 2 is a block diagram describing a preferred embodiment of the procedure for preparing seismic data inversion parameters, residuals and constraints for the Joint Inversion steps of FIG. 1.
Figure 4:
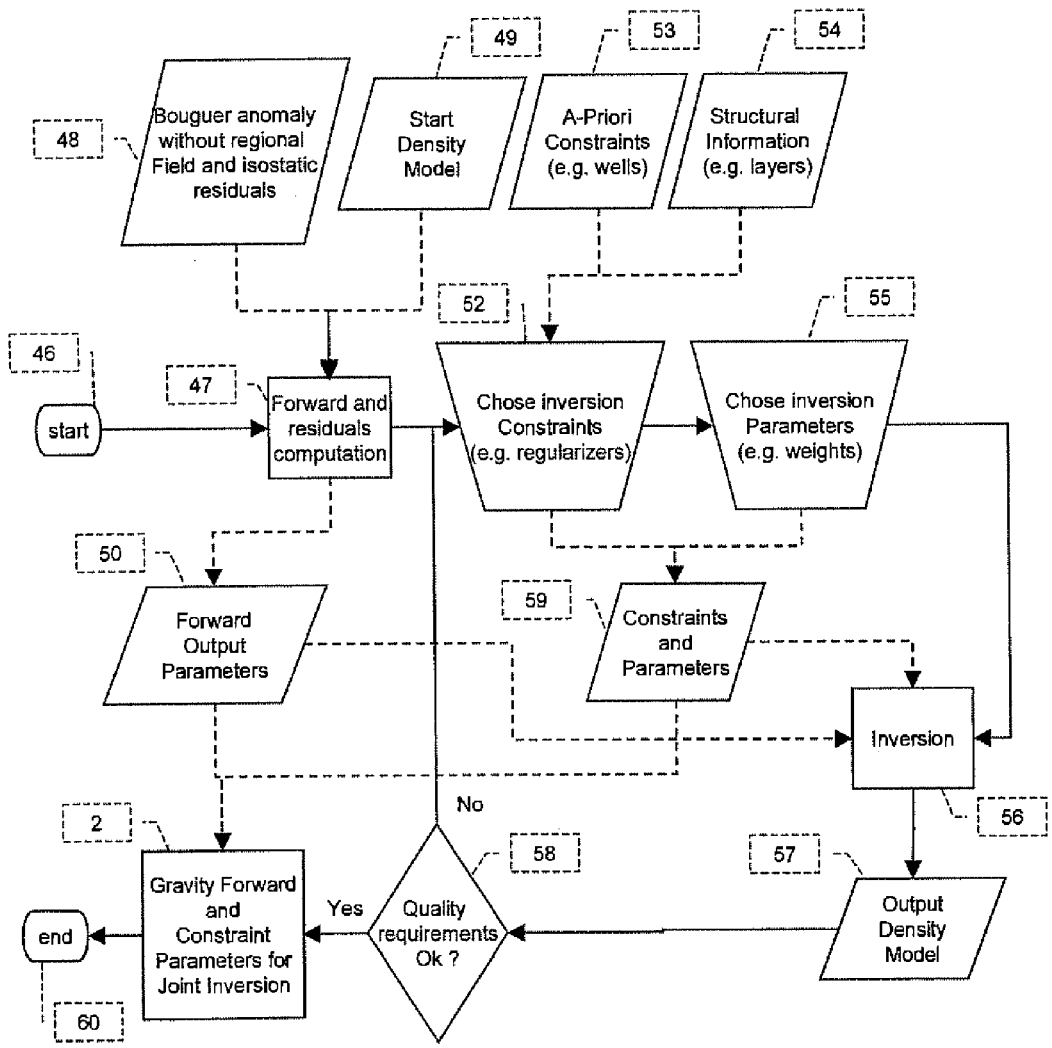
FIG. 4 is a block diagram describing a preferred embodiment of the procedure for preparing gravity data inversion parameters, residuals and constraints for the Joint Inversion steps of FIG. 1.
Figure 5:
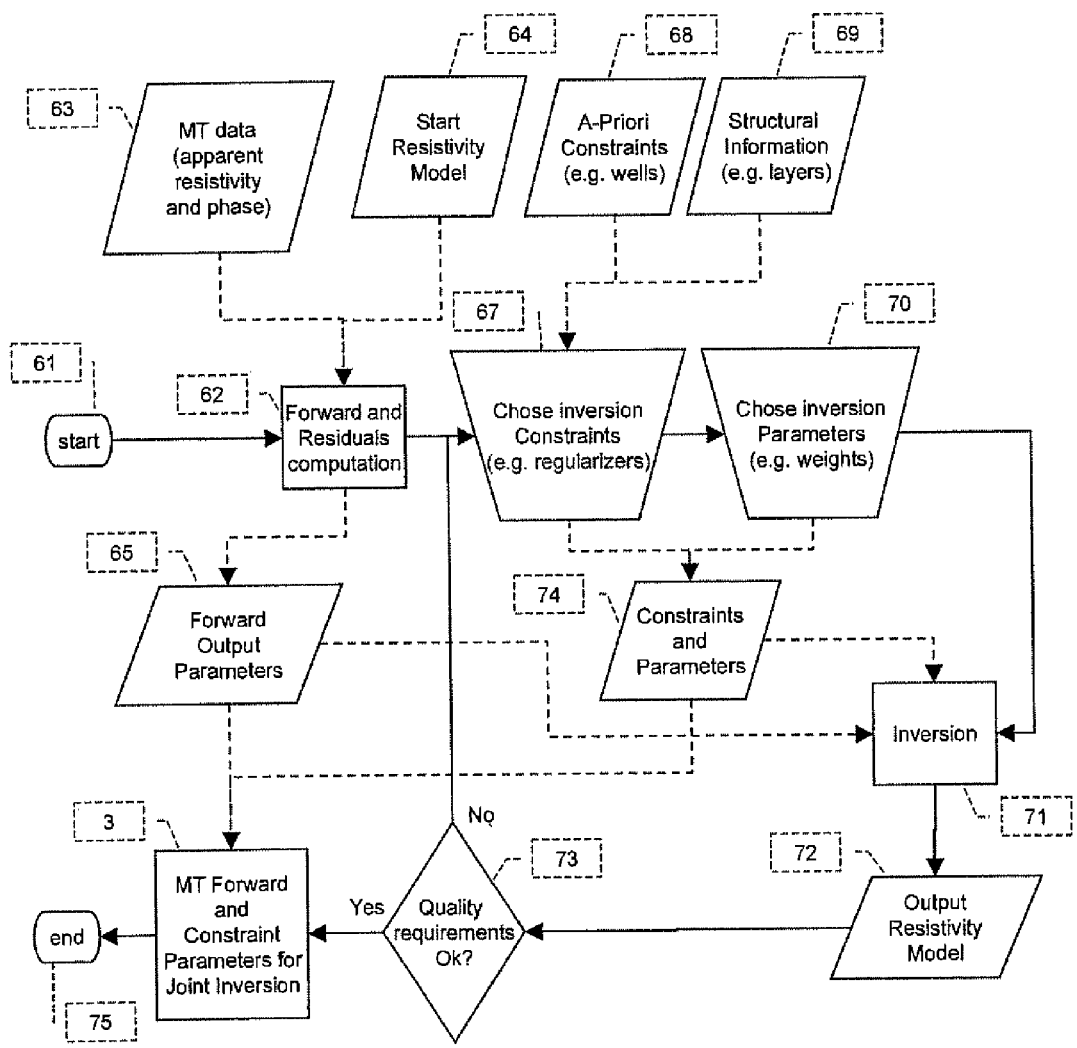
FIG. 5 is a block diagram describing a preferred embodiment of the procedure for preparing magnetotelluric data inversion parameters, residuals and constraints for the Joint Inversion steps of FIG. 1.

Preferred embodiments of the procedures for preparing said input data would be disclosed with reference to the block diagrams of FIGS. 2, 4 and 5, respectively.

Constraints, if available, are evaluated and applied separately within each of the above procedures, so that the seismic portion of the joint inversion problem could contain constraints that are different from the constraints contained by the gravity or MT methodologies and vice-versa.

Figure 6:
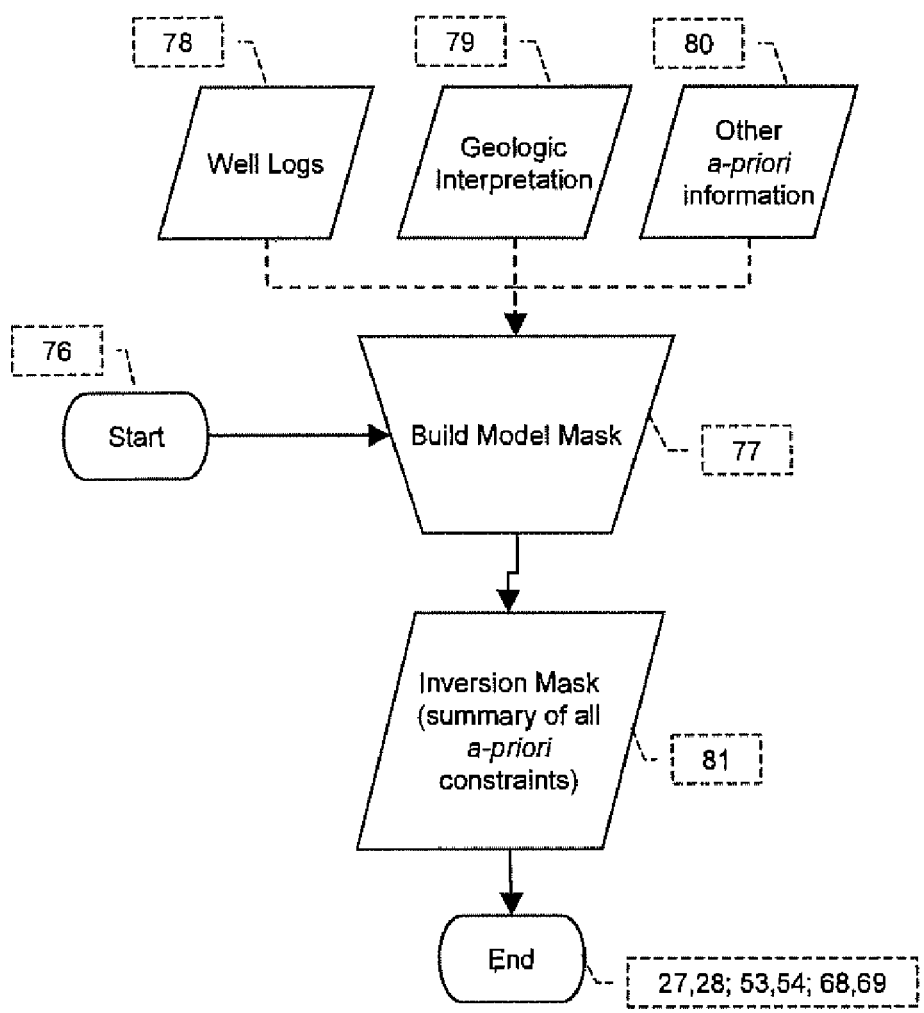
FIG. 6 is a block diagram describing a preferred embodiment of the procedure for defining the inversion constraints steps of FIGS. 2, 4 and 5.

A preferred embodiment of the procedure for defining the inversion constraints will be disclosed with reference to the block diagram of FIG. 6.

The input data are then prepared through the setting of the appropriate inversion parameters and parameterization of the model to enter the Joint Inversion (JI) process (step 4).

Figure 7:
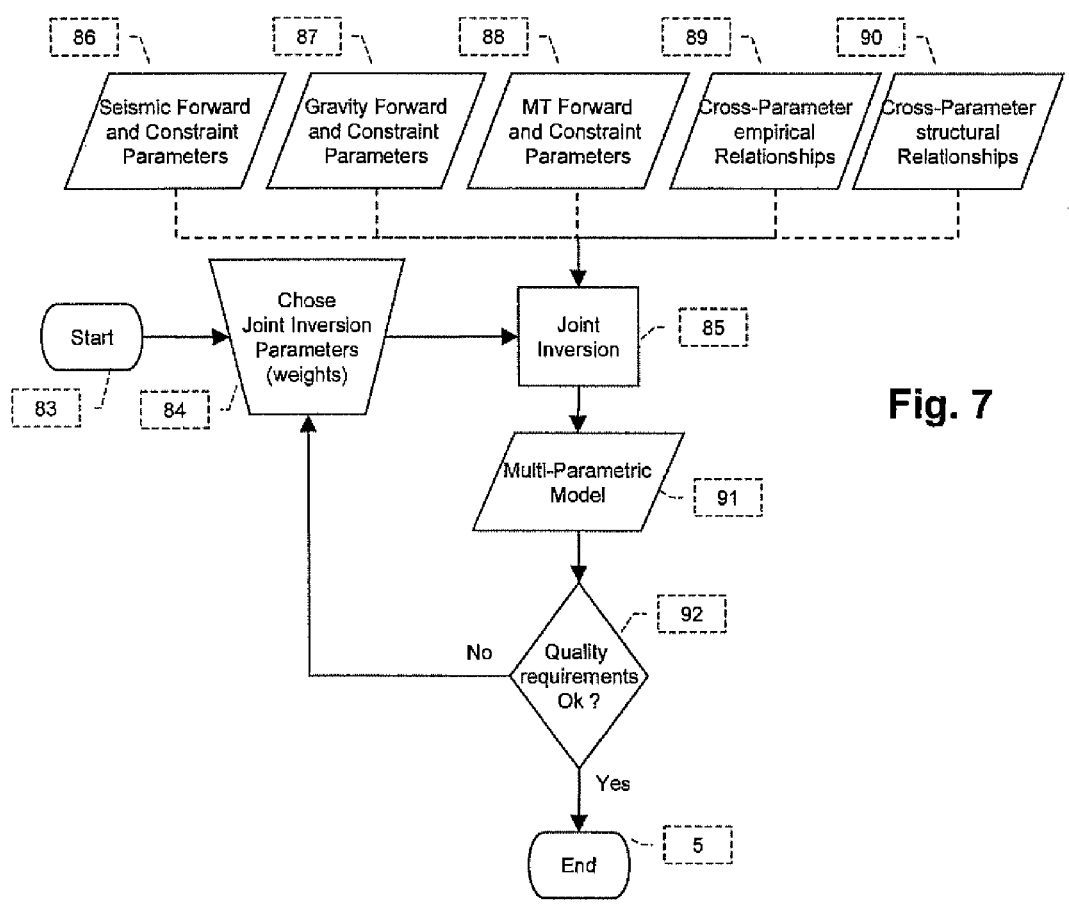
FIG. 7 is a block diagram describing a preferred embodiment of the procedure for performing the Joint Inversion steps of FIG. 1.

A preferred embodiment of the Joint Inversion process will be disclosed with reference to the block diagram of FIG. 7.

The output of such a preliminary Joint Inversion process is a multiparametric model 5, or in other words a model whose elements are simultaneously a function of multiple physical parameters; in the specific case density ($\delta$) 6, resistivity ($\rho$) 7 and P-velocity ($V_p$) 8.

The model parameterization can be different and adaptive (cells of variable dimension in horizontal and vertical directions) for the different methodologies in accordance with the different expected accuracy of the various methodologies used in the Joint Inversion.

The Joint Inversion performed at the current step of the velocity model building procedure has the goal of providing an initial but robust velocity model (in most of the cases purely data-driven) to be used with PSDM (step 9), an already known procedure.

The advantage of performing a Joint Inversion with multiple parameters at the initial stages of the velocity model building procedure is that of deriving a robust velocity model from surface to depth which is able to provide a reliable migration since the very first iteration steps.

This characteristic is considered an advantage in relation to the successive step where a migration velocity analysis (step 10) has to be performed and the residual curvature of the Common Image Gathers (CIGs) 11 needs to be evaluated.

Figure 3:
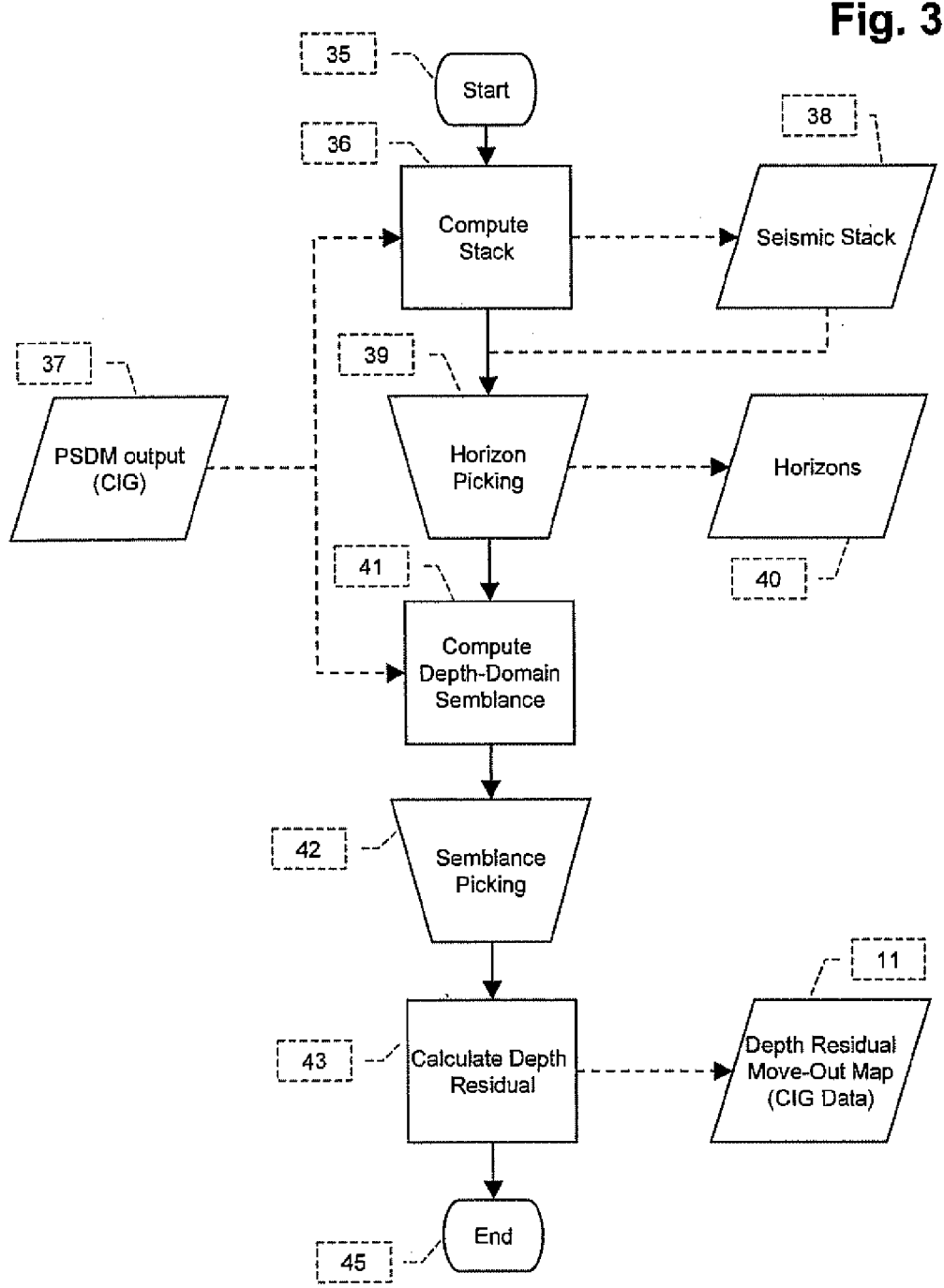
FIG. 3 is a block diagram describing a preferred embodiment of the procedure for generating the CIG residual data through a migration velocity analysis.

A preferred embodiment of the procedure for generating the residual data through a migration velocity analysis will be disclosed with reference to the block diagram of FIG. 3.

The Common Image Gather (CIG) residuals (or migration depth residual maps) 11 are a result of the Pre-Stack Depth Migration process (PSDM) and are therefore dependant to the velocity field used for the migration.

The CIG residual data (or the migration depth residual maps) therefore vary during the progressing of the velocity model building workflow and need to be re-evaluated every time an updated velocity model is used for PSDM.

Since in this phase the structural information (i.e. the geometry of migrated reflectors) need to be evaluated to enable the inversion of the CIGs, the availability of a seismic section migrated with a reliable velocity model provides a better starting point for the successive velocity model building step.

The CIG residual 11 are evaluated by the user (step 12) to define whether or not the amount of the measured residuals would require successive inversion iterations with consequent velocity model update.

If the amount of residuals is less than a defined threshold, the current velocity model (and corresponding PSDM section) is considered to have reached the best possible results (or in other words to have achieved the best convergence to the real velocity distribution) the current velocity model is acquired (step 13) and the velocity model building procedure is stopped (step 14).

If the residual maps 11 deriving from migration velocity analysis (step 10) is evaluated to be larger that a preset threshold (step 12), then a successive Joint Inversion iteration for velocity update is performed (step 18).

The input data to be evaluated through Joint Inversion in this case will be constituted by FB and CIG data 15, by the gravity Bouguer anomaly 16 and by the MT apparent resistivity and phase 17, with corresponding constraints for each procedure.

The initial (or most likely) distributions of parameters for the different procedures (i.e. initial models) are provided by the results (the multiparametric model 5) of the preceding joint inversion iteration: density 6 ($\delta$), resistivity 7 ($\rho$) and P-velocity 8 ($V_P$).

The data are then used to perform an additional Joint Inversion (step 18), which generates a new multiparametric model 5 to be used for PSDM iteration.

The described workflow provides rapid convergence to reliable velocity models which in turns allow improved seismic images in complex geologic settings.

The method according to the invention includes therefore the following steps:
 prepare the input data (1, 2, 3) and evaluate the relevant constraints, if any;
 make a Joint Inversion (step 4) on the input data (1, 2, 3) and on the relevant constraints, if any, to build a multiparametric model 5 including density ($\delta$) 6, resistivity ($\rho$) 7 and P-velocity ($V_p$) 8 models;
 make a Pre-Stack Depth Migration (step 9) in view of the velocity model 8;
 make a migration velocity analysis (step 10) and evaluate the residual curvature of the Common Image Gathers (CIGs) to realize a CIG residual map 11;
 evaluate the CIG residual map 11 (step 12);
 if the residuals are smaller than a preset threshold, acquire the current velocity model (step 13) and stop the velocity model building procedure (step 14); otherwise adjust the input data (15-17) in view of the current multiparametric model 5, make a new Joint Inversion (step 18), build a new multiparametric model 5 and repeat steps 9, 10 and 12.

FIG. 2 is a block diagram describing a preferred embodiment of the procedure for preparing seismic data 1 for the Joint Inversion steps 4 and 18 of FIG. 1, contemplating the cases of use of FB data alone, CIG data alone or the simultaneous use of FB and CIG data together.

The seismic portion of the Joint Inversion starts with the evaluation of whether or not using the FB data (step 116). In case of a positive decision the successive step consists of the calculation of the forward problem (i.e. the theoretical calculation of the distribution of travel-time arrivals through a given velocity model at several observation points) and of the corresponding residuals defined as the difference between the observed (i.e. measured) values and the calculated ones (step 117).

In order to perform step 117, the observed FB data 118 and a velocity model 119 must be provided to the forward calculation routine.

The output parameters 120 obtained from the forward solution are collected (step 1) for the Joint Inversion.

Whatever decision about the use of the FB data is taken (step 116), the procedure continues with the decision about using the CIG data (step 122).

It is supposed that at least one of the two or both seismic data would be available for Joint Inversion.

If at least one positive answer is given to the questions at steps 116 and 122, the procedure continues with the definition of the forward problem (steps 117 and 123) that can be performed simultaneously for both types of seismic travel-time data (i.e. both FB and CIG data).

The next step consists of the evaluation of the inversion constraints (step 129 and successive) that will be detailed later.

The use of CIG data involves the calculation of the CIG forward solution and the evaluation of the residuals (step 123), which in turn requires the use of a velocity model (step 119) and of the observed CIG residuals obtained from Migration Velocity Analysis (step 124).

The output of the CIG forward and residuals (step 125) is collected (step 1) for the Joint Inversion.

The second set of parameters that have to be provided to Joint Inversion are the constraints and the inversion parameters (step 133) that need to be evaluated through test inversion iterations and successive evaluation of the results.

This task is achieved by acquiring the a-priori constraints 127 (such as wells) and the available structural information 128 (such as description of the shape of geologic bodies or layers), by choosing (step 129) inversion constraints (such as regularizes) and inversion parameters (such as weights—step 130) which are collected in 133.

Finally a working inversion (step 126) is performed where the input data residuals and forward solutions are provided by the FB data 120 alone, by the CIG data 125 alone or the simultaneous use of both data 120 125.

The output of the inversion is a velocity model 131, which is passed through a quality revision of the results (step 132) that has the purpose of evaluating if the chosen inversion parameters are optimal or need to be refined.

In the latter case a new set of inversion constraints and parameters are chosen (steps 129 and 130) and are evaluated and tested through a new inversion (step 126).

At each inversion iteration, the selected constraints and parameters (step 133) are outputted and collected (step 1) for the Joint Inversion once the quality requirements of the inversion (step 132) are accepted.

The procedure for preparing seismic data input 1 comprises therefore the steps of:
 verify (step 116) if FB data are to be used: if so acquire the observed FB data 118 and a velocity model 119, calculate (step 117) the FB forward and the residuals (i.e. the differences between the observed values and the calculated ones), store said FB output parameters 120 and verify (step 122) if CIG data are to be used;
 if FB data are not to be used, verify (step 122) if CIG data are to be used: if so, acquire the observed CIG data 124 and velocity model 119, calculate (step 123) the distribution of CIG forward and the residuals (i.e. the differences between the observed values and the calculated ones), store said CIG data 125, acquire the a-priori constraints 127 and the available structural information 128 and chose the inversion constrains (step 129);
 if CIG data are not to be used, acquire the a-priori constraints 127 and the available structural information 128 and chose the inversion constrains (step 129);
 chose the inversion parameter (step 130) and perform a working inversion (step 126) to obtain an output velocity model 131;
 store the output constrains and parameters 133 provided by the chosen inversion constraints and parameters (steps 129 and 130);

evaluate (step 132) if the output velocity model 131 is optimal: if so, collect the FB data 120, the CIG data 125 and the output constrains and parameters 133 and send the collected data to the Joint Inversion (step 4); otherwise chose again the inversion constraints (step 129) and repeat the steps 130, 126, 131 and 132.

FIG. 3 is a block diagram describing a preferred embodiment of the procedure for generating, through a Migration Velocity Analysis (FIG. 1, step 10), the CIG residual data (FIG. 1, step 11 and FIG. 2, step 124).

The analysis is performed on the CIG gathers 37 deriving from the last PSDM output (step 9) that must be summed together (step 36) to generate a seismic image of the underground geology called stack (step 38).

The seismic image is then used to perform a geological interpretation which consists of the picking, in a known way, of the shapes and geometries of geologic units (step 39) which generates a set of horizon data (40) expressed as line segments.

The CIG data 37 deriving from the last PSDM (step 9) are then used to calculate the well-known depth domain semblance function (step 41) which is maximum where the maximum residual is present.

The picking of the maximum of the semblance function (step 42) allows the calculation of depth residuals (step 43) which generate depth residuals maps (CIG residuals 11).

The procedure for making the migration velocity analysis comprises therefore at least the following steps:
  compute the seismic data stack (step 36) by using the CIG gathers obtained from the Pre-Stack Depth Migration (step 9);
  perform (step 39) a horizon picking on the seismic stack 38, generating a set of horizon data 40;
  calculate (step 41) a depth-domain semblance function;
  picking (step 42) the depth-domain semblance function;
  calculate (step 43) the depth residuals to generate the CIG residual maps (11).

FIG. 4 is a block diagram describing a preferred embodiment of the procedure for preparing the gravity data inversion parameters 2 for the Joint Inversion steps 4 and 18 of FIG. 1.

As per the preparation of the seismic data 1 portion of the Joint Inversion, the preparation of the gravity data for the Joint Inversion involves the calculation (step 47) of the forward solution and of the residuals (i.e. of the differences between the observed values and the calculated ones) using as input the Bouguer gravity anomaly to which the regional field and the isostatic gravity fields are subtracted (step 48) and an initial density model (step 49).

The forward output parameters and the residuals 50 (differences between the observed values and the calculated ones) are collected and stored (step 2).

The next step consists of outputting the appropriate constraints and parameters 59 for the gravity inversion that are collected and stored (step 2) for the Joint Inversion once the quality requirements of the gravity inversion (step 58) are accepted.

To accomplish this, the procedure has to run through test (trial and error) inversions (step 56) which will use the chosen inversion constraints and inversion parameters (step 59).

The evaluation of the inversion constraints (step 52) use as input the available a-priori data 53, such as wells, and the available structural or geologic information 54 provided in form of line segments which describe the shape of geologic bodies or layers.

The selection of inversion parameters 55 consists of the definition of relative weights of the inversion equations.

The output density model from the inversion 57 is evaluated for quality requirements (step 58) and it is sent back to another inversion run (steps 52, 55, 56 and 58) if the quality requirements are not satisfied.

The procedure for preparing the gravity data inversion parameters 2 comprises at least the following steps:
  acquire the Bouguer gravity anomaly and modify it by subtracting the regional field and the isostatic gravity fields (step 48);
  acquire the modified Bouguer gravity anomaly and an initial density model 49, calculate (step 47) the forward parameters and the residuals (ices the differences between the observed values and the calculated ones) and store the forward output parameters and the residuals 50;
  acquire the a-priori constraints 53 and the available structural information 54 and chose the inversion constraints (step 52);
  chose the inversion parameters (step 55) and store the chosen constrains and parameters 59;
  in view of the stored constrains and parameters 59, perform test inversions (step 56) to obtain an output density model 57;
  evaluate (step 58) if the output density model 57 is optimal: if so, send to the Joint Inversion (step 4) the stored forward output parameters and the residuals 50 and the chosen constrains and parameters 59; otherwise chose again the inversion constrains (step 52) and repeat the steps 55, 56 and 58.

FIG. 5 is a block diagram describing a preferred embodiment of procedure for preparing the magnetotelluric (MT) data 3 for the Joint Inversion steps 4 and 18 of FIG. 1.

Similarly to the preparation of the gravity data portion 2 of the Joint Inversion, the preparation of the MT data 3 for the Joint Inversion involves the calculation of the forward parameters and of the residuals (step 62) using as input the apparent resistivity and phase curves obtained from a pre-processing of the observed electromagnetic (EM) field data (step 63) and an initial resistivity model (step 64).

The forward output parameters and the residuals 65 are collected and stored (step 3).

The next step consists of outputting the appropriate constraints and parameters for the MT inversion 74 that are collected and stored (step 3) for the Joint inversion once the quality requirements of the MT inversion (step 73) are accepted.

To accomplish this, the procedure has to run through test (trial and error) inversions (step 71) which will use the chosen inversion constraints and inversion parameters (step 74).

The choice of the inversion constraints (step 67) use as input the available a-priori data 68 (such as wells) and the available structural or geologic information 69 provided in form of line segments which describe the shape of geologic bodies or layers.

The choice of the inversion parameters (step 70) consists of the definition of relative weights of the inversion equations.

The output resistivity model 72 generated by the test inversions (step 71) is evaluated for quality requirements (step 73) and it is sent back to another inversion run (steps 67, 70, 71 and 73) if the quality requirements are not satisfied.

The procedure for preparing the magnetotelluric (MT) data 3 comprises therefore at least the following steps:
  acquire the apparent resistivity and phase data 63 and an initial resistivity model 64, calculate (step 62) the forward parameters and the residuals and store the forward output parameters and the residuals 65;

acquire the a-priori constraints 68 and the available structural information 69 and chose the inversion constraints (step 67);

chose the inversion parameters (step 70) and store the chosen constrains and parameters 74;

in view of the stored constrains and parameters 74, perform a test inversion (step 71) to obtain an output resistivity model 72;

evaluate (step 73) if the output resistivity model 72 is optimal: if so, send to the Joint Inversion (step 4) the stored forward output parameters and the residuals 65 and the chosen constrains and parameters 74; otherwise chose again the inversion constrains (step 67) and repeat steps 70, 71 and 73.

FIG. 6 is a block diagram describing a preferred embodiment of the procedure for defining the inversion constraints from a-priori data (e.g. how to set parameters in the models that must not be modified by the inversion) or from geologic interpretation (e.g. how to set parameters in the models that must be conditioned by chosen mathematical operators).

This procedure can be used to define the a-priori constrains and the structural information (127, 128; 53, 54; 68, 69) acquired in the procedures (disclosed on FIGS. 2, 4 and 5) for preparing the input data (1, 2, 3 and 15, 16, 17) of FIG. 1.

The task of incorporating a-priori constraints in the Joint Inversion consists of building a model mask (step 77) which takes as input all the available information consisting of well logs 78, of geologic interpretation 79 and of other a-priori information 80.

By doing this, the user indicates which portions of the model are subject to external constraints such as:

portions of the model where the distribution of the geophysical parameters is already known (e.g. in the case of well logs) and do not need to be included in the unknown parameters to be inverted;

where external information such as a geologic interpretation are used, these can delimit the portions of the model to be inverted from the portions of the model where one wants to maintain the results of previous iterations (layer-stripping approach)

using geologic interpretation information, the model mask indicates sub portions of the model where uniformity of the parameters is expected during the inversion (this task is performed by setting the model covariance matrix).

The combination of all the a-priori constraints is used to generate the constraints inversion mask (step 81) which is provided to the Joint Inversion (this can be one mask or a set of different masks, describing different constraints).

The procedure for defining the inversion of the constraints from a-priori data comprises therefore the following steps:

acquire well logs 78, geologic interpretation 79 and other a-priori information 80 and build a model mask (step 77);

generate a constraints inversion mask (step 81);

provide the constraints inversion mask to the procedure for preparing the input data (1, 2, 3 and 15, 16, 17).

Without departing from the scope of the invention, several constraints inversion masks (describing different constraints) can be generated for each procedure for preparing one of the input data (1, 2, 3 and 15, 16, 17) and provided to the relevant preparing procedure.

FIG. 7 is a block diagram describing a preferred embodiment of the procedure for performing Joint Inversion (JI) steps 4 and 18 of FIG. 1.

The procedure starts with choosing (step 84) a set of Joint Inversion parameters such as the relative weights that have to be applied to the different input methodologies.

The simultaneous Joint Inversion is then performed (step 85) taking as input the previously generated seismic travel-time inversion problem forward and constraints parameters 86, gravity forward output and constraints parameters 87, magnetotelluric forward output and constraints parameters 88, cross-parameter empirical relationships 89 (which indicate links between physical values to be inverted) and cross-parameters structural relationships 90, which impose pattern similarity of the different inverted models.

The Joint Inversion is performed through minimization of a new objective function that follows from application of well established least squares inverse problem theory. The objective function is:

$$\phi(m, a, b, c) = \sum_{k=1}^{N} a_k r_k^T C_{D,k}^{-1} r_k + \sum_{k=1}^{N} b_k \|\xi_k(m_k)\|^2 + \sum_{k=1}^{Nl} c_k \|\psi_k(m)\|^2$$

where the first term is the weighted sum of data square errors ($a_k$ are weights chosen by the user, while $C_{D,k}^{-1}$ is the inverse data covariance matrix for the k-th domain), the second term is the weighted sum of different regularization terms, one for each domain ($b_k$ are weights chosen by the user, $\xi_k$ is a generic regularization function) and the third term is the weighted sum of different kind of linking terms between different domains ($c_k$ are user defined weights, $\psi_k$ are linking functions among parameters and $N_l$ is the total number of links used); vectors a, b and c are composed respectively of weights $a_k$, $b_k$ and $c_k$, k-1, 2, ..., N.

In particular, for imposing the structural similarity among models (differences to be minimized in a least square sense—step 90) we use the following cross-gradients function generalized to a 3D case:

$$|t(x,y,z)|^2 = |\nabla m_1(x,y,z) \times \nabla m_2(x,y,z)|^2$$

where $m_1$ and $m_2$ are two models (e.g. velocity and density, velocity and resistivity, and resistivity and gravity).

Joint inversion is carried out minimizing the objective function with respect to the multi-parametric model vector.

The output of the Joint Inversion is a multiparametric model (step 91), or in other words represents the distribution of cross-correlated seismic velocity ($V_p$), density ($\delta$) and resistivity ($\rho$).

The Joint Inversion model results are evaluated for quality requirements and geological reliability (step 92) and, if they are not optimal, they can be subject to other iterations where the chosen Joint Inversion parameters are modified (step 84).

The procedure for performing a Joint Inversion step (step 4 and 18) includes therefore the following steps:

choose a set of Joint Inversion parameters (step 84);

acquire seismic travel-time forward output and constraints parameters 86, gravity forward output and constraints parameters 87, magnetotelluric forward output and constraints parameters 88, cross-parameter empirical relationships 89 and cross-parameters structural relationships 90;

perform a simultaneous Joint Inversion (step 85);

generate a multiparametric model (step 91);

evaluate (step 92) if the multiparametric model is optimal for quality requirements and geological reliability: if so, use the Joint Inversion step, otherwise choose a modified set of Joint Inversion parameters (step 84) and repeat steps 85 and 92.

Without departing from the scope of the invention, a person skilled in the art can make to the previously described method all the changes and improvements suggested by the normal experience or by the evolution of the art.

The invention claimed is:

1. A method for building a velocity model for pre-stack depth migration for geological exploration comprising:
   receiving seismic, gravity and electromagnetic data relating to a geologic subsurface; and
   simultaneously joint inverting the seismic, gravity and electromagnetic data to produce the velocity model.

2. The method according to claim 1, wherein the seismic data includes first break data;
   wherein the gravity data includes Bouguer gravity data; and
   wherein the electromagnetic data includes magnetotelluric data.

3. The method according to claim 1, further comprising:
   preparing the seismic, gravity, and electromagnetic data as input data, wherein the inverting is performed on the input data to build a multiparametric model including at least the velocity model;
   performing the pre-stack depth migration;
   performing migration velocity analysis and valuating a residual curvature of common image gathers (CIGs) to realize CIG residual data;
   comparing the CIG residual data with a preset threshold;
   when the CIG residual data is larger than the preset threshold:
      adjusting the input data using the multiparametric model,
      performing a new simultaneous joint inversion on the adjusted input data, and
      building a new multiparametric model.

4. The method according to claim 3 wherein the multiparametric model includes density and resistivity models.

5. The method of claim 3, wherein performing the migration velocity analysis comprises:
   generating a seismic image from CIG gathers output by the pre-stack depth migration; and
   calculating the CIG residual data based at least in part on the CIG gathers.

6. The method according to claim 1, wherein performing the inverting comprises:
   choosing a set of joint inversion parameters;
   acquiring seismic forward output and constraints parameters, gravity forward output and constraints parameters, electromagnetic forward output and constraints parameters, cross-parameter empirical relationships and cross-parameter structural relationships;
   performing a simultaneous joint inversion;
   generating a multiparametric model including the velocity model;
   comparing the multiparametric model with one or more quality requirements; and
   when the multiparametric model does not satisfy at least one of the one or more quality requirements, choosing a modified set of joint inversion parameters.

7. The method of claim 1, wherein the electromagnetic data includes magnetotelluric data, and wherein the inverting comprises simultaneously jointly inverting the seismic, gravity and magnetotelluric data.

8. The method of claim 1, further comprising preparing the seismic data, wherein the preparing comprises:
   when first break data in the seismic data is used, computing one or more residuals based at least on differences between observed first break data and calculated data using at least the velocity model; and
   outputting at least one of the one or more residuals for use in the inverting.

9. The method of claim 8, wherein preparing the seismic data further comprises:
   when the common image gather data is used, computing one or more residuals based on at least differences between observed common image gather data and calculated data using the velocity model, and outputting at least one of the one or more residuals for use in the inverting.

10. The method of claim 8, wherein preparing the seismic data further comprises:
    choosing at least one inversion constraint using a priori information including well log data ; and
    outputting the at least one inversion constraint for use in the inverting.

11. The method of claim 1, further comprising preparing the gravity data, wherein the preparing comprises:
    computing one or more residuals based at least in part on differences between observed gravity data and calculated gravity data using at least a density model, and outputting at least one of the one or more residuals for use in the inverting.

12. The method of claim 11, wherein preparing the gravity data further comprises:
    choosing at least one inversion constraint using a priori information including well log data; and
    outputting the at least one inversion constraint for use in the inverting.

13. The method of claim 1, further comprising preparing the electromagnetic data, wherein the preparing comprises:
    computing one or more residuals based at least in part on differences between observed electromagnetic data and calculated electromagnetic data using at least a resistivity model, and outputting at least one of the one or more the residuals for use in the inverting.

14. The method of claim 1, further comprising:
    defining at least one inversion constraint that specifies at least one parameter in the velocity model that is not to be modified by the inverting.

15. The method of claim 14, wherein defining the at least one inversion constraint comprises:
    building a model mask that takes as input well log data and geologic interpretation data; and
    generating a constraints inversion mask that is provided to the inverting.

16. The method of claim 1, wherein the inverting comprises solving an objective function that includes the seismic data, the gravity data, and the electromagnetic data.

17. The method of claim 1, wherein the inverting comprises minimizing an objective function that includes the seismic data, the gravity data, and the electromagnetic data.

18. The method of claim 1, wherein the receiving and inverting are performed by a computer.

19. A method for building a velocity model for geological exploration comprising:
    receiving seismic data, gravity data, and electromagnetic data relating to a geologic subsurface; and
    performing simultaneous joint inversion on the seismic data, gravity data, and electromagnetic data to produce the velocity model.

20. The method of claim 19, wherein the electromagnetic data include magnetotelluric data, and wherein performing the simultaneous joint inversion comprises performing the simultaneous joint inversion on the seismic data, gravity data, and magnetotelluric data.

21. The method of claim 19, wherein performing the simultaneous joint inversion comprises minimizing an objective function that includes the seismic data, the gravity data, and the electromagnetic data.

22. The method of claim 19, wherein the receiving and performing are performed by a computer.

23. The method according to claim 1, wherein the seismic data includes seismic post migration residuals in depth;

wherein the gravity data includes Bouguer gravity data; and wherein the electromagnetic data includes magnetotelluric data.

\* \* \* \* \*